Patented Feb. 17, 1931

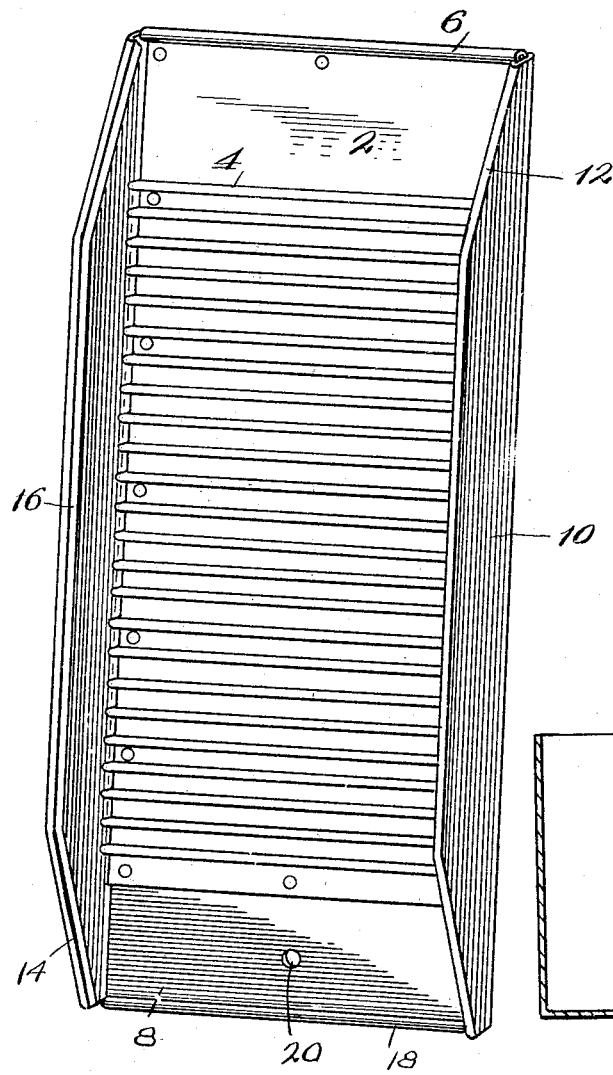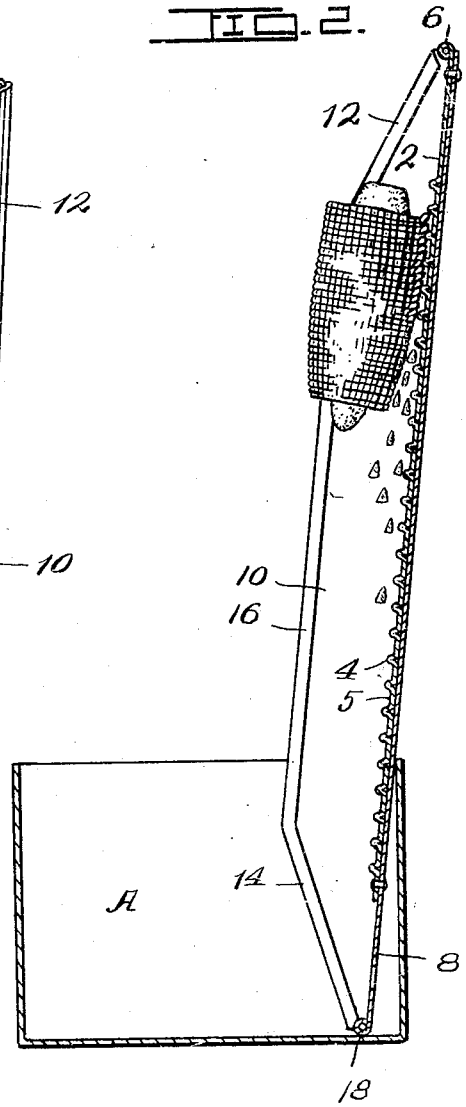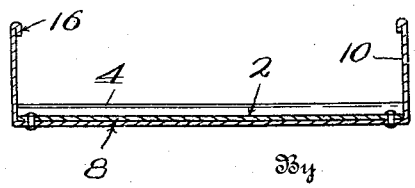

1,792,518

UNITED STATES PATENT OFFICE

WILLIAM STRICKER, OF KANSAS CITY, MISSOURI

CORN SHELLER

Application filed February 5, 1927. Serial No. 166,140.

My invention relates to corn shellers and one object is to provide a device of this character whereby various kinds of corn, such, for instance, as Indian corn, Kaffir corn, pop corn, etc., can be removed from the cob at a less expenditure of time and labor than is possible when the corn is shelled entirely by hand.

A further object is to provide a device which is particularly adapted for shelling seed corn as it does not crack or otherwise damage the kernels and thus render them unfit for planting.

Another object is to provide a simple, durable and efficient device of this character which can be manufactured and sold to farmers and others at a reasonable price.

In order that the invention may be fully understood, reference will now be had to the accompanying drawing, in which:

Fig. 1 is a perspective view of the corn sheller.

Fig. 2 is a central longitudinal sectional view of the corn sheller.

Fig. 3 is a cross section of the corn sheller.

In carrying out the invention I employ a body 2 preferably of oblong shape and provided with a series of projections or teeth 4. The body 2 consists of suitable material such as galvanized sheet metal of suitable gage and the teeth 4 are formed by folding the body at intervals upon itself as shown more clearly by Fig. 2, in order that said teeth will present an abrupt surface and thus prove very efficient in removing kernels from the cob during the shelling process. The teeth 4 are arranged transversely of the body 2 and preferably extend the full width of the latter. The body 2 is provided at its upper margin with a transverse bead 6 which not only reinforces said margin, but also presents a smooth edge to the operator when shelling corn.

8 designates a back plate which is riveted or otherwise firmly secured to the back of the body 2, below which latter it extends for supporting the device when in operation as shown by Fig. 2. The back plate 8 is preferably made from the same kind of material comprising the body 2 and is provided along its longitudinal margins with forwardly projecting guards 10, which reinforce the device. The guards 10 extend preferably the full length of the back plate 8 as shown, and have their upper and lower ends 12 and 14, respectively, inclined while their forward margins are folded inwardly and backwardly as indicated at 16 for the purpose of presenting a smooth edge and reinforcing said guards 10. The lower margin of the back plate 8 is reinforced by folding said margin upwardly as indicated at 18.

In shelling corn, the lower end of the device is placed in a suitable receptacle such as A. The upper end of the device is then supported with one hand while an ear of corn is grasped in the other hand. The imperfect grains are then shelled off one end of the cob by holding the ear at a suitable angle and repeatedly rubbing it downwardly over the teeth 4 until all of the imperfect grains are removed. The ear of corn is then reversed and the imperfect grains are removed in the same manner from the opposite end of the cob. As the imperfect grains or kernels are not suitable for planting they are removed from the receptacle A, after which the perfect kernels are shelled from the cob by holding the ear at approximately the angle shown on Fig. 2 and rubbing the ear downwardly over the teeth 4, the ear being turned from time to time until all of the kernels have been removed. When removing the perfect kernels the ear is held with the butt end uppermost and as said ear is rubbed downwardly over the teeth 4, its forward end is gradually depressed to bring the successive kernels into engagement with said teeth 4. As the kernels are removed they are prevented from rolling or bounding off the sides of the body 2 by the guards 10 which cooperate with said body 2 in directing all of the shelled corn into the receptacle A, so that there will be no waste. The bead 6 at the upper portion of the body 2 and the folded portions 16 of the margins of the guards 10 present a smooth surface to the operator so that there will be no chance of scratching or cutting the hands while the corn is being shelled. The inclined upper ends 12 of said guards 10 prevent the sleeve of the operator from catching as would likely be the case if the corners were left square. A hole 20 is formed in the lower portion of the back plate so that the device may be hung upon a nail when not in use.

From the foregoing description it will be understood that I have provided a corn sheller with which grains can be removed from the cob without damage, and which possesses the advantages above pointed out, and while I have shown and described the preferred embodiment of the invention I reserve all rights to such changes and modifications thereto as properly fall within the spirit and scope of the invention as claimed.

Having thus described my invention, what I claim and desire to secure by Letters Patent, is:

A corn sheller consisting of a rectangular sheet metal body, a multiple of teeth extending transversely of and formed upon said body by folding the latter at intervals, a transverse bead integral with the upper margin of said body, a sheet metal plate covering the back of said body and extending a suitable distance below the latter, a transverse fold formed at the lower portion of said plate, and guards formed integral with and extending longitudinally of and projecting forwardly from two opposite margins of said plate and having upper inclined ends.

In testimony whereof I affix my signature.

WILLIAM STRICKER.